United States Patent
Weinfield (10) Patent No.: US 11,380,206 B2
(45) Date of Patent: Jul. 5, 2022

(54) METHODS AND SYSTEMS FOR TRANSMITTING BASIC SAFETY MESSAGES

(71) Applicants: DENSO International America, Inc., Southfield, MI (US); DENSO CORPORATION, Aichi (JP)

(72) Inventor: Aaron D. Weinfield, Encinitas, CA (US)

(73) Assignees: DENSO INTERNATIONAL AMERICA, INC., Southfield, MI (US); DENSO CORPORATION, Aichi (JP)

(*) Notice: Subject to any disclaimer, the term of this patent is extended or adjusted under 35 U.S.C. 154(b) by 173 days.

(21) Appl. No.: 16/834,031

(22) Filed: Mar. 30, 2020

(65) Prior Publication Data

US 2021/0304612 A1    Sep. 30, 2021

(51) Int. Cl.
*G08G 1/16* (2006.01)
*B60W 60/00* (2020.01)
*H04W 4/40* (2018.01)
*B62D 15/02* (2006.01)
*G06V 20/56* (2022.01)

(52) U.S. Cl.
CPC ....... *G08G 1/167* (2013.01); *B60W 60/00274* (2020.02); *B62D 15/021* (2013.01); *G06V 20/588* (2022.01); *H04W 4/40* (2018.02)

(58) Field of Classification Search
CPC .. G08G 1/167; B60W 60/00274; H04W 4/40; G06K 9/00798; B62D 15/021
See application file for complete search history.

(56) References Cited

U.S. PATENT DOCUMENTS

| | | |
|---|---|---|
| 6,502,033 B1 | 12/2002 | Phuyal |
| 9,725,037 B2 | 8/2017 | Goudy et al. |
| 2008/0186382 A1 | 8/2008 | Tauchi et al. |
| 2017/0365166 A1* | 12/2017 | Lu .......... G08G 1/0133 |
| 2018/0056999 A1* | 3/2018 | Damiani ........... G01S 13/931 |
| 2021/0294323 A1* | 9/2021 | Bentahar .......... G05D 1/0088 |

* cited by examiner

*Primary Examiner* — Tan Q Nguyen
(74) *Attorney, Agent, or Firm* — Burris Law, PLLC (57) ABSTRACT

A method for broadcasting a basic safety message (BSM) packet from a host vehicle includes receiving sensor data from one or more vehicle sensors provided at the host vehicle. The method includes determining whether the sensor data indicates a lane change of the host vehicle. The method includes performing a corrective action on at least one path history entry that is stored in a database in response to the sensor data indicating the lane change. The method includes generating and broadcasting the BSM packet based on the at least one path history entry.

18 Claims, 4 Drawing Sheets

METHODS AND SYSTEMS FOR TRANSMITTING BASIC SAFETY MESSAGES

FIELD

The present disclosure relates to systems and methods for performing corrective actions on path history entries of a basic safety message packet.

BACKGROUND

The statements in this section merely provide background information related to the present disclosure and may not constitute prior art.

Vehicle-to-vehicle, vehicle-to-infrastructure, vehicle-to-network, vehicle-to-pedestrian, vehicle-to-device, and vehicle-to-grid systems (collectively referred to as V2X systems) rely on a host vehicle receiving messages from one or more surrounding vehicles, roadside devices, and/or other external devices. The host vehicle may receive the messages using, for example, a dedicated short-range communication (DSRC) system, a cellular-V2X (C-V2X) communication system, and/or the like.

Vehicles of a V2X systems may also utilize Global Network Satellite System (GNSS) receivers (e.g., Global Positioning System (GPS) receivers) for determining position of the vehicle and are configured to periodically exchange basic safety messages (BSMs) that include the current vehicle position (e.g., latitude, longitude, elevation, among others), speed, heading, brake status, turn signal status, and/or other vehicle information. In one example, the BSM may be configured in accordance with a standard protocol, such as Society of Automotive Engineers SAE J2735 and are used or transmitted in accordance with SAE J2945/1 or SAE J3161/1.

The BSMs may also include path history (PH) information of the vehicle which includes a plurality of data points that collectively indicate a previous or current trajectory of the vehicle. The PH information may be utilized for predicting roadway geometry and for executing various local safety systems, such as a forward collision warning system, a blind spot warning system, a lane change warning system, and/or the like. However, the PH information may inaccurately represent the previous trajectory of the vehicle when the vehicle changes lanes, thereby inhibiting the vehicle from accurately identifying occupied lanes.

SUMMARY

This section provides a general summary of the disclosure and is not a comprehensive disclosure of its full scope or all of its features.

The present disclosure provides a method for broadcasting a basic safety message (BSM) packet from a host vehicle. The method includes receiving sensor data from one or more vehicle sensors provided at the host vehicle. The method includes determining whether the sensor data indicates a lane change of the host vehicle. The method includes performing a corrective action on at least one path history entry that is stored in a database in response to the sensor data indicating the lane change. The method includes generating and broadcasting the BSM packet based on the at least one path history entry.

In some forms, the sensor data includes information indicative of a vehicle speed, steering wheel position, or a combination thereof.

In some forms, determining whether the sensor data indicates the lane change further includes comparing the sensor data that includes information indicative of the vehicle speed and the steering wheel position to one or more entries of the database, where each of the one or more entries is associated with a predefined correlation between the vehicle speed, the steering wheel position, and a lane change determination.

In some forms, the sensor data includes one or more images from an image sensor, as the one or more vehicle sensors, and determining whether the sensor data indicates the lane change further includes performing a lane marking detection analysis on the one or more images.

In some forms, performing the corrective action on the at least one path history entry in response to the sensor data indicating the lane change further includes deleting the at least one path history entry from a database.

In some forms, performing the corrective action on the at least one path history entry in response to the sensor data indicating the lane change further includes modifying the at least one path history entry to include at least one of a confidence score of the lane change and a direction of the lane change.

In some forms, receiving the sensor data from the one or more vehicle sensors further includes receiving at least one of steering wheel position data from a steering wheel position sensor and image data from an image sensor. In some forms, modifying the at least one path history entry to include the direction of the lane change further includes determining the direction of the lane change based on at least one of the steering wheel position data and the image data.

In some forms, the sensor data includes at least one of vehicle speed data, steering wheel position data, and one or more images. In some forms, modifying the at least one path history entry to include the confidence score of the lane change further includes: generating a first confidence value representing a first probability of the lane change of the host vehicle based on the vehicle speed data and the steering wheel position data; generating a second confidence value representing a second probability of the lane change of the host vehicle based on the one or more images; and determining the confidence score of the lane change based on the first confidence value and the second confidence value.

In some forms, the BSM packet further comprises information indicating at least one of the confidence score of the lane change and the direction of the lane change.

In some forms, modifying the at least one path history entry to include the confidence score of the lane change further includes receiving state information from a lane change indicator; and determining the confidence score of the lane change based on the state information of the lane change indicator.

In some forms, generating the BSM packet further includes in response to performing the corrective action on the at least one path history entry that is stored in the database, adding a data frame to the at least one path history entry, where the data frame is indicative of the lane change of the host vehicle.

The present disclosure provides a system for broadcasting a basic safety message (BSM) packet from a host vehicle. The system comprises a processor and a nontransitory computer-readable medium comprising instructions that are executable by the processor. The instructions comprise: receiving sensor data from one or more vehicle sensors provided at the host vehicle; determining whether the sensor data indicates a lane change of the host vehicle; performing a corrective action on at least one path history entry that is stored in a database in response to the sensor data indicating the lane change; and generating and broadcasting the BSM packet based on the at least one path history entry.

In some forms, the sensor data includes information indicative of a vehicle speed, steering wheel position, or a combination thereof.

In some forms, the instructions to determine whether the sensor data indicates the lane change further includes comparing the sensor data that includes information indicative of the vehicle speed and the steering wheel position to one or more entries of the database, wherein each of the one or more entries is associated with a predefined correlation between the vehicle speed, the steering wheel position, and a lane change determination.

In some forms, the sensor data includes one or more images from an image sensor, as the one or more vehicle sensors, and determining whether the sensor data indicates the lane change further comprises performing a lane marking detection analysis on the one or more images.

In some forms, the instructions to perform the corrective action on the at least one path history entry in response to the sensor data indicating the lane change further includes deleting the at least one path history entry from a database.

In some forms, the instructions to perform the corrective action on the at least one path history entry in response to the sensor data indicating the lane change further includes modifying the at least one path history entry to include at least one of a confidence score of the lane change and a direction of the lane change.

In some forms, the sensor data includes at least one of steering wheel position data and image data. In some forms, the instructions to modify the at least one path history entry to include the direction of the lane change further includes determining the direction of the lane change based on at least one of the steering wheel position data and the image data. In some forms, the sensor data includes at least one of vehicle speed data, steering wheel position data, and one or more images. In some forms, the instructions to modify the at least one path history entry to include the confidence score of the lane change further includes: generating a first confidence value representing a first probability of the lane change of the host vehicle based on the vehicle speed data and the steering wheel position data; generating a second confidence value representing a second probability of the lane change of the host vehicle based on the one or more images; and determining the confidence score of the lane change based on the first confidence value and the second confidence value.

In some forms, the BSM packet further comprises information indicating at least one of the confidence score of the lane change and the direction of the lane change.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to systems and methods for performing corrective actions on PH information generated by a host vehicle when the host vehicle makes a lane change. The host vehicle is configured to determine when a lane change is occurring and perform one or more corrective actions to enhance the PH information in the event of a lane change. Accordingly, the enhanced PH information alerts nearby vehicles of whether the host vehicle is in the same lane or an adjacent lane, and thus, improves accuracy of various functions that utilize the PH information such as identifying occupied lanes, predicting roadway geometry, and executing various local safety systems, as described herein in greater detail.

Figure 1A:
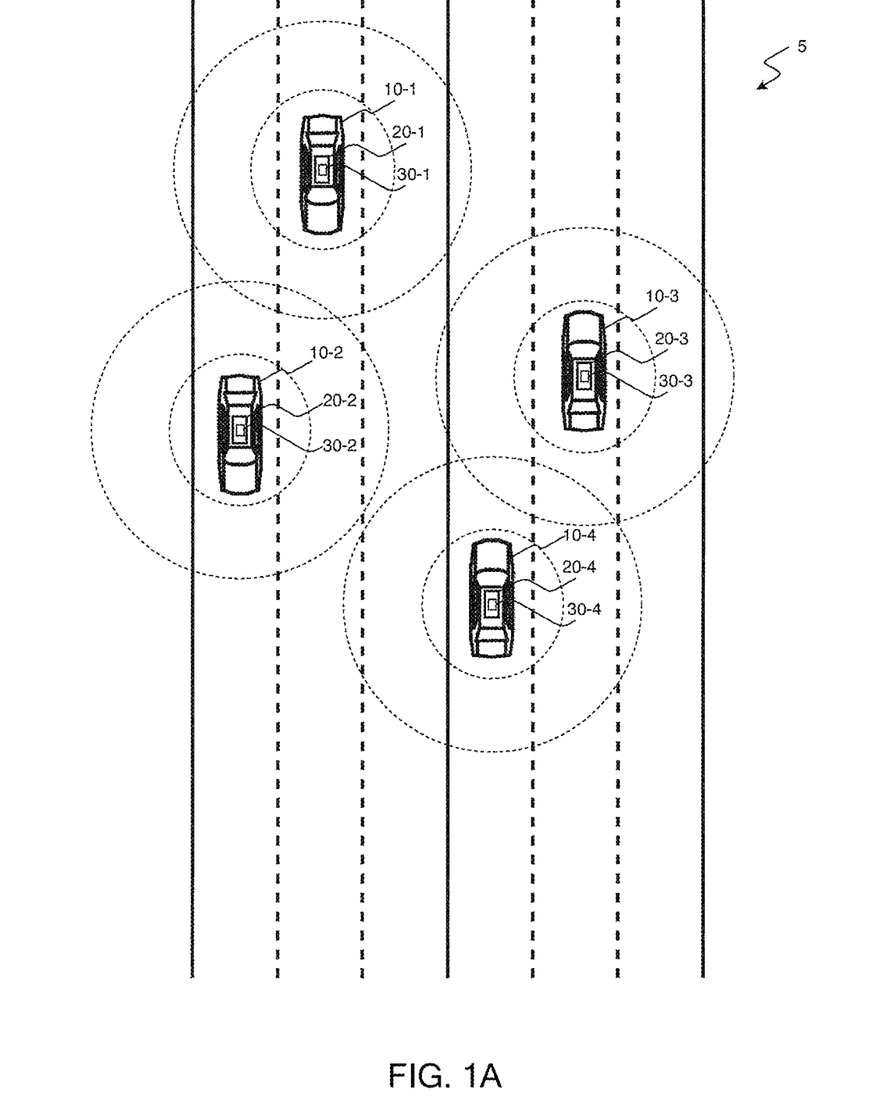
FIG. 1A illustrates a plurality of vehicles of a roadway system in accordance with the teachings of the present disclosure.

Referring to FIG. 1A, a roadway system 5 including a plurality of vehicles with V2X systems is shown. In one form, roadway system 5 includes vehicles 10-1, 10-2, 10-3, 10-4 (collectively referred to as vehicles 10) that are respectively equipped with V2X systems 20-1, 20-2, 20-3, 20-4 (collectively referred to as V2X systems 20). In one form, all of the components of the V2X system 20 may be located at one or multiple locations on the roof of the vehicle. In another form, some of the components of the V2X system 20 may be located in the interior of the vehicle 10. While the V2X system 20 is illustrated as being located on the roof of the vehicle 10, the V2X system 20, and any or all of its components, may be disposed at any location on the vehicle 10 (e.g., the front, rear, and sides of the vehicle 10).

The V2X system 20 may be configured to transmit and receive signals representing, for example, early warnings of accidents and driving hazards to and from other V2X systems 20 provided at remote vehicles, infrastructure, and/or pedestrians, among others. Accordingly, local safety systems communicatively coupled to the V2X system 20 may be configured to predict future accidents and driving hazards based on communication with remote vehicles, infrastructure, pedestrians, among others, that are equipped with V2X systems 20 by calculating the current and future positions of the vehicle 10.

In one form, the V2X system 20 is a DSRC system that communicates with other vehicles or infrastructure equipped with a DSRC system by using a 75 megahertz (MHz) band around a 5.9 gigahertz (GHz) signal. In another form, the V2X system 20 is a C-V2X system that communicates with other vehicles or infrastructure equipped with a C-V2X system by using a 75 MHz band around a 5.9 GHz signal. It should be understood that other communication systems, center frequencies, and/or bandwidths may be implemented within the V2X system 20.

The V2X system 20 is configured to broadcast and receive BSMs. In some forms, the V2X system 20 broadcasts BSMs at a specified rate such as at a frequency of 10 Hz. It should be understood that the V2X system 20 may broadcast the BSMs at other rates. In one form, the BSM includes one or more parts that provide specific information related to the vehicle 10. As an example, a first part of the BSM may indicate a vehicle position (e.g., latitude, longitude, elevation, among others), a vehicle speed, a vehicle heading, a brake status, a turn signal status, and/or other vehicle information. Furthermore, a second part of the BSM may include event flags, path prediction information, and PH information. It should be understood that the BSM may have any number of parts associated with various information and is not limited to the parts described herein.

The PH information may include a plurality of data points indicating a previous trajectory of the vehicle. In some forms, the PH information may be utilized for identifying occupied lanes, predicting roadway geometry, and for executing various local safety systems, such as a forward collision warning system, bond spot warning system, a lane change warning system, and/or the like. In some forms, the PH information is calculated in accordance with the standard set forth in at least one of SAE J2945/1 and SAE J3161/1.

Figure 1B:
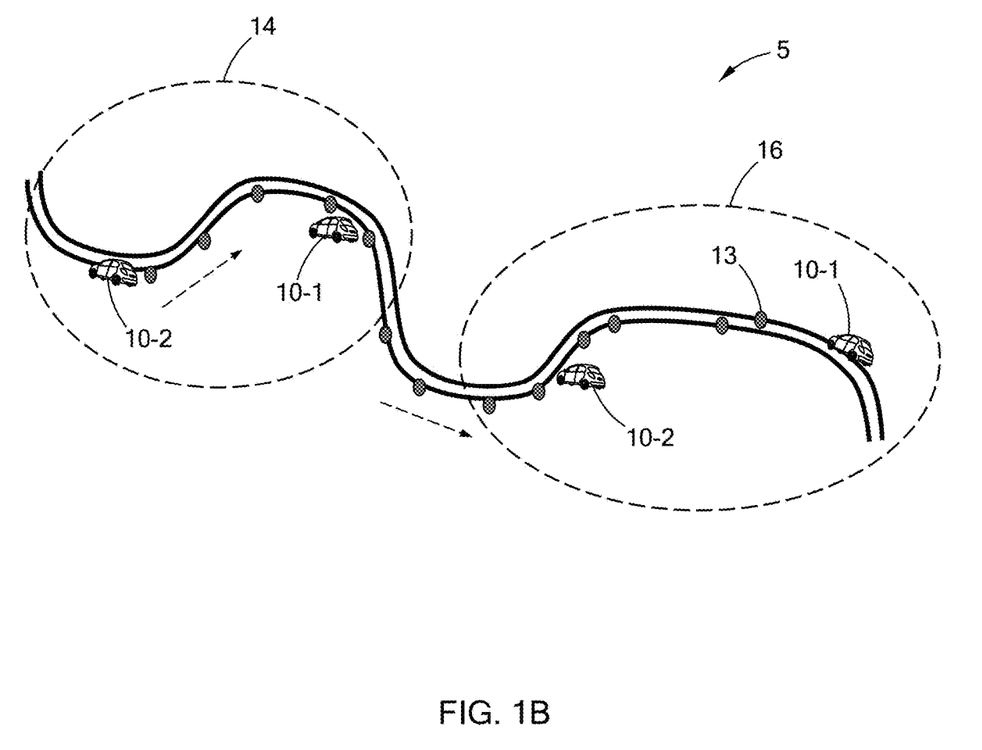
FIG. 1B illustrates a vehicle making a lane change in a roadway system in accordance with the teachings of the present disclosure.

For example, as shown in FIG. 1B, vehicles 10-1 and 10-2 exchange BSMs that include PH information, and based on BSMs from vehicle 10-1, vehicle 10-2 may determine that it is in the same lane as vehicle 10-1 based on a plurality of PH points 13 in region 14. During a lane change and as shown in region 16, however, the vehicle 10-2 may incorrectly determine that it is in the same lane as vehicle 10-1 based on the plurality of PH points 13 in region 16. As described below in further detail, the vehicle 10-1 is configured to perform a PH correction routine when the vehicle 10-1 determines that it has performed a lane change. Accordingly, the vehicle 10-1 may broadcast BSMs with enhanced PH information, thereby enabling other vehicles 10, such as vehicle 10-2, to accurately identify occupied lanes, predict the roadway geometry, and execute various local safety systems when and/or after the lane change has occurred.

Figure 2:
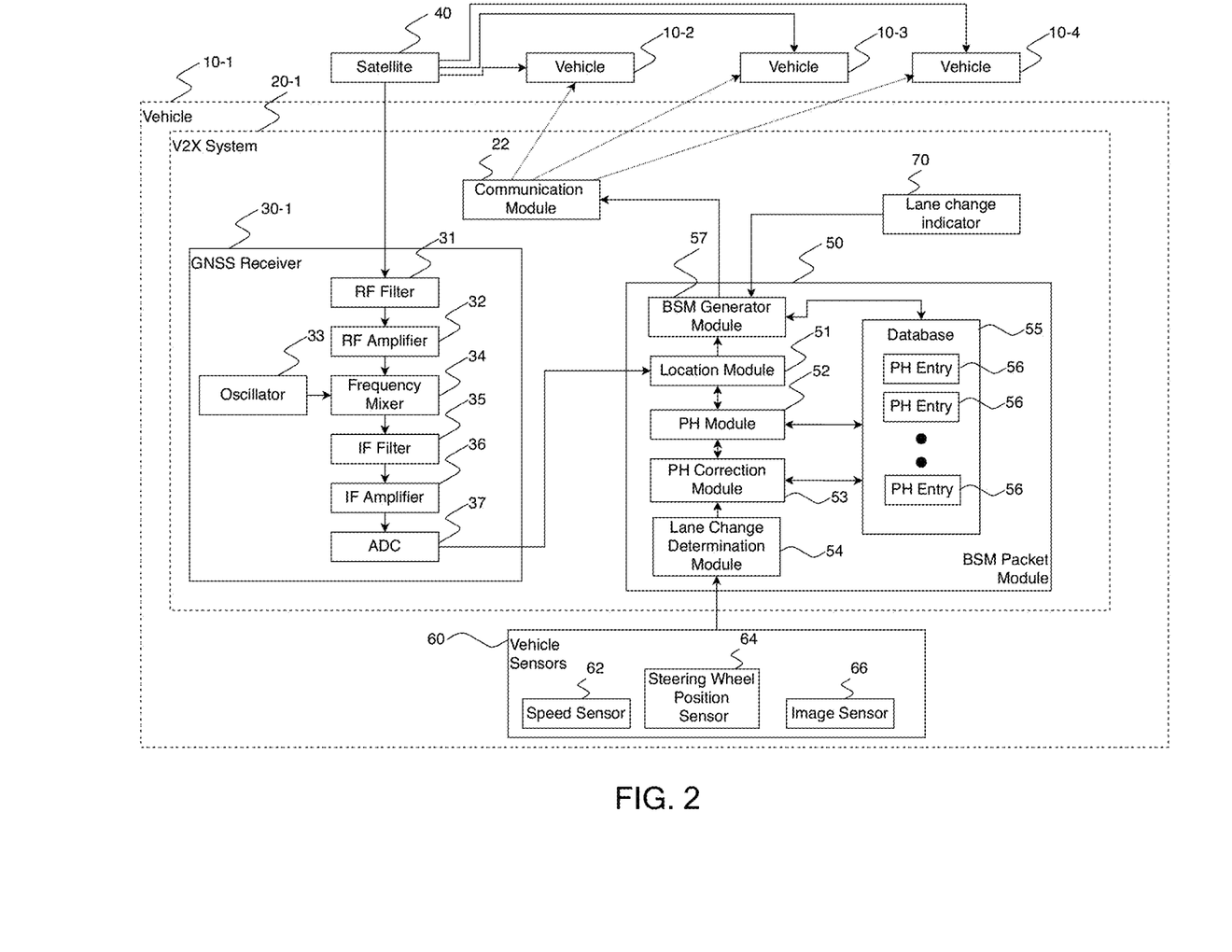
FIG. 2 is a functional block diagram of a vehicle in accordance with the teachings of the present disclosure.

Referring to FIG. 2, a block diagram of the vehicles 10 is shown. As described above, the vehicle 10-1 includes the V2X system 20, which includes a communication module 22, the GNSS receiver 30, a BSM packet module 50, one or more vehicle sensors 60, and a lane change indicator 70. While the communication module 22, the GNSS receiver 30, the BSM packet module 50, the one or more vehicle sensors 60, and the lane change indicator 70 are shown as part of vehicle 10-1, it should be understood that vehicles 10-2, 10-3, 10-4 include similar components.

The BSM packet module 50 includes a location module 51, a PH module 52, a PH correction module 53, a lane change determination module 54, a database 55, and a BSM generator module 57. In order to execute the functionality described herein, the BSM packet module 50 may be implemented by one or more processor circuits that execute machine-readable instructions stored in a nontransitory computer-readable medium, such as a read-only memory (ROM) circuit and/or a random-access memory (RAM) circuit.

In one form, the communication module 22 is configured to generate and broadcast V2X signals and receive V2X signal from external devices. As an example, the vehicle 10-1 may use V2X signals received via the communication module 22 to perform various path/trajectory planning routines and/or the like. Accordingly, in order to perform the functionality described herein, the communication module 22 includes one or more transceivers, radio circuits, amplifiers, and/or modulation circuits among other electronic components. Along with exchanging data with external devices, the communication module 22 may also be communicably coupled to a vehicle communication network (not shown) such as controller area network (CAN) or local interconnect network (LIN), for transmitting data to other modules within the vehicle 10-1. The communication module 22 may further include one or more processor circuits that execute machine-readable instructions stored in a non-transitory computer-readable medium, such as a ROM circuit and/or a RAM circuit for performing the functional operations described herein such as processing messages received from other vehicles and forwarding data from the messages to one or more other modules within the vehicle 10-1.

In some forms, the GNSS receiver 30 receives geospatial location data that includes positioning and time information from a GNSS satellite 40. In order to perform the functionality described herein, the communication module 22 includes one or more transceivers, radio circuits, amplifiers, modulation circuits, among others, for generating V2X signals, and broadcasting the V2X signals, as described below in further detail.

In one form, the GNSS receiver module 30-1 includes a radio frequency (RF) filter 31, an RF amplifier 32, a local oscillator 33, a frequency mixer 34, an intermediate frequency (IF) filter 35, an IF amplifier 36, and an analog-to-digital converter (ADC) 37, The radio frequency (RF) filter 31 and the RF amplifier 32 are configured to suppress image frequencies and to prevent the V2X system 20 from becoming saturated. The local oscillator 33 is configured to provide a mixing frequency to the frequency mixer 34 in order to change the received frequency into a new, intermediate frequency. The IF filter 35 and the IF amplifier 36 are configured to amplify the signal received from the frequency mixer 34 and limit the intermediate frequencies to a certain bandwidth. Subsequently, the ADC 37 converts the filtered intermediate frequency to a digital signal that is referenced as a GNSS signal and is provided to the BSM packet module 50 to, for example, calculate location information associated with the vehicle 10, as described below in further detail.

The location module 51 of the BSM packet module 50 is configured to receive the digital signal from the GNSS receiver module 30-1 and calculate the location information associated with the vehicle 10-1. In some forms, the location module 51 is configured to calculate the location information associated with the vehicle 10-1. As an example, the location module 51 is configured to calculate the location information associated with the vehicle 10-1 by generating one or more timestamps associated with the GNSS signal received by the GNSS receiver 30. As another example, the location module 51 may obtain multiple timestamps and determine a location associated with the vehicle 10-1 based on the multiple timestamps and/or vehicle speed information obtained from a speed sensor 62 of the vehicle sensors 60.

In some forms, the PH module 52 is configured to generate PH entries 56-1, 56-2, . . . , 56-$n$ (collectively referred to as PH entries 56) based on the location information as determined by the location module 51. In some forms, the PH entries 56 are generated in accordance with the standard set forth in at least one of SAE J2945/1 and SAE J3161/1. When the PH module 52 generates the PH entries 56, the PH module 52 is configured to store the PH entries 56 in a database 55 (e.g., a repository, a cache, and/or the like). The PH module 52 may selectively store and/or delete the PH entries 56 from the database 55. As an example, the PH module 52 may be configured to limit the amount of PH entries 56 stored in the database 55 (e.g., ten PH entries 56) by continuously deleting the oldest PH entry once a new PH entry above the predefined threshold (e.g., deleting the first PH entry when the eleventh PH entry is generated, deleting the second PH entry when the twelfth PH entry is generated, and so on) is generated.

The lane change determination module 54 is configured to determine whether a lane change has occurred based on data obtained from the vehicle sensors 60, which include the speed sensor 62, a steering wheel position sensor 64, and an image sensor 66. In some forms, the lane change determination module 54 may be configured to determine whether a lane change has occurred based on vehicle speed data obtained from the speed sensor 62 and steering wheel position data obtained from the steering wheel position sensor 64. As an example, the lane change determination module 54 may determine that a lane change has occurred in response to the vehicle speed data and the steering wheel position data correspond to an entry of a lookup table indicating a lane change. As an example, a first entry of the lookup table may identify (i) a vehicle speed of less than 10 mph and (ii) an angular rotation of greater than or equal to 90° to the right or left corresponds to a lane change. As another example, a second entry of the lookup table may identify (i) a vehicle speed of greater than or equal to 10 mph and less than 30 mph and (ii) an angular rotation of greater than or equal to 60° to the right or left corresponds to a lane change. As yet another example, a third entry of the lookup table may identify (i) a vehicle speed of greater than or equal to 30 mph and less than 40 mph and (ii) an angular rotation of greater than or equal to 45° to the right or left corresponds to a lane change. As a further example, a fourth entry of the lookup table may identify (i) a vehicle speed of greater than or equal to 40 mph and less than 50 mph and (ii) an angular rotation of greater than or equal to 30° to the right or left corresponds to a lane change. An example lookup table correlating the vehicle speed and the angular rotation to the lane change is shown below.

| Vehicle Speed (v) | Angular Rotation (r) | Lane Change Direction |
|---|---|---|
| v < 10 mph | r ≥ 90° | Right |
| v < 10 mph | r ≤ −90° | Left |
| 10 mph ≤ v < 30 mph | r ≥ 60° | Right |
| 10 mph ≤ v < 30 mph | r ≤ −60° | Left |
| 30 mph ≤ v < 40 mph | r ≥ 45° | Right |
| 30 mph ≤ v < 40 mph | r ≤ −45° | Left |
| 40 mph ≤ v < 50 mph | r ≥ 30° | Right |
| 40 mph ≤ v < 50 mph | r ≤ −30° | Left |
| 50 mph ≤ v < 60 mph | r ≥ 20° | Right |
| 50 mph ≤ v < 60 mph | r ≤ −20° | Left |
| 60 mph ≤ v < 70 mph | r ≤ 10° | Right |
| 60 mph ≤ v < 70 mph | r ≥ −10° | Left |
| 70 mph ≤ v < 80 mph | r ≥ 5° | Right |
| 70 mph ≤ v < 80 mph | r ≤ −5° | Left |

It should be understood that the one or more entries of the lookup table may include any combination of vehicle speeds, angular positions, and/or upper and lower bounds thereof, and the one or more entries of the lookup table are not limited to the examples described herein. In some forms, the lookup table may be predefined by a manufacturer of the vehicle 10-1.

The lane change determination module 54 may be configured to determine whether a lane change has occurred based on image data obtained by the image sensor 66. The image sensor 66 may be any sensor configured to obtain image data, such as a two-dimensional camera, a three-dimensional camera, an infrared sensor, a radar scanner, a laser scanner, a light detection and ranging (LIDAR) sensor, an ultrasonic sensor, and/or the like. The image sensor 66 may obtain image data of various features of the roadway system 5, such as traffic infrastructure, lane markings, and/or the like.

In some forms, when the image sensor 66 obtains one or more images of the lane markings, the lane change determination module 54 is configured to perform a lane marking detection analysis on the one or more images. As an example, the lane change detection analysis may include executing an image processing algorithm on the one or more images to identify one or more geometric features of the roadway (e.g., applying a Gaussian filter to the one or more images to identify edges and, more specifically, lane markings of the roadway system 5), and determining whether the a sequence of the one or more images indicates that the vehicle 10-1 is making a lane change. It should be understood that various lane change detection analyses may be performed to determine the occurrence of a lane change and is not limited to the examples described herein.

In some forms, the lane change determination module 54 may be configured to determine whether a lane change has occurred based on data obtained from the vehicle sensors 60 and/or a state of the lane change indicator 70 (e.g., a turn signal relay that is activated by an operator of the vehicle 10-1 when indicating an intent to make a lane change, a module within the vehicle 10-1 that is activated in response to the vehicle 10-1 autonomously indicating an intent to make a lane change, among others). As an example, the lane change determination module 54 may determine a lane change has occurred in response to the lane change indicator 70 being activated and at least one of the vehicle sensors 60 indicating a lane change has occurred, as described above. As another example, the lane change determination module 54 may determine a lane change has occurred in response to the lane change indicator 70 being activated for a predefined period of time (e.g., the lane change indicator 70 is activated for a period of time that is between a minimum threshold and a maximum threshold).

The lane change determination module 54 may be configured to determine a direction of the lane change. As an example, the lane change determination module 54 may determine a direction of the lane change based on a sign of the steering wheel position data received from the steering wheel position sensor 64 (e.g., a positive sign may indicate that the vehicle 10-1 is changing lanes from left to right, and a negative sign may indicate that the vehicle 10-1 is change lanes from right to left). As another example, the lane change determination module 54 may determine the direction of the lane change based on the sequence of the one or more images obtained from the image sensor 66 while performing the lane change detection analysis, as described above. As yet another example, the lane change determination module 54 may determine the direction of the lane change based on a state of the lane change indicator 70 (e.g., the lane change indicator 70, when activated, may be in one of a left-turn state and a right-turn state).

In one form, the lane change determination module 54 is configured to determine a confidence score of the lane change. The lane change determination module 54 may determine the confidence score of the lane change based on at least one of vehicle speed data received from the speed sensor 62, the steering wheel position data received from the steering wheel position sensor 64, the one or more images received from the image sensor 66, and the state of the lane change indicator 70. That is, using the various methods described herein for detecting a lane change, the lane change determination module 54 is configured to assign a confidence value for each method, and if multiple methods indicate a lane change, the higher a total confidence value indicating the likelihood of the lane change. In one form, the confidence value for each method or combination of methods may be predefined, such as in a lookup table.

The confidence value assigned to each method may be represented as a binary system (e.g., a confidence value of 0 or 1 is assigned to the method). In one form, when using the binary system for the confidence value, a value of 0 may indicate that no lane change is detected, and a value of 1 may indicate that a lane change is detected for the corresponding method. As an example, the lane change determination module 54 may generate a confidence value of 0 if the vehicle speed data, the steering wheel position data, and the image data, indicate that no lane change is detected. Furthermore, the lane change determination module 54 may generate a confidence value of 1 if the state of the lane change indicator 70 indicates that a lane change has occurred.

The confidence value assigned to each method may also be represented using a decimal system (e.g., a confidence value between 0 and 1 is assigned to the method). As an example, the lane change determination module 54 may generate a confidence value of 0.67 if the vehicle speed data, the steering wheel position data, and the image data, indicate that the probability of a lane change is 67%. Furthermore, the lane change determination module 54 may generate a confidence value of 0.83 if the state of the lane change indicator 70 indicates that the probability of a lane change is 83%. As an example, when using the decimal value for the confidence value, a value between 0 and 1 may indicate a probability of the lane change associated with the method.

It should be understood that any combination of the speed data, steering wheel position data, the one or more images, and the state of the lane change indicator 70 can be used to generate the confidence values and is not limited to the examples described herein.

The lane change determination module 54 may then determine the confidence score of the lane change based on the confidence values of the one or more lane detection methods. In some forms, the confidence score may be based on an average, sum, and/or any other suitable arithmetic operation of the confidence values. In one variation, each of the confidence values may be weighted prior to performing the arithmetic operation. In another variation, only a set of the confidence scores may be utilized to determine the confidence score. Based on the confidence score, the lane change determination module 54 determines if a lane change has occurred. For example, if the confidence score is greater than or equal a predefined threshold (e.g., 60%), the lane change determination module 54 determines that a lane change has occurred.

In one form, the PH correction module 53 is configured to modify at least one PH entry of the database 55 based on a determination of whether a lane change has occurred. As an example, if the lane change determination module 54 determines that a lane change has not occurred, the PH correction module 53 does not delete the plurality of PH entries from the database 55. As another example, if the lane change determination module 54 determines that a lane change has occurred, the PH correction module 53 may delete at least one PH entry 56 from the database 55 (e.g., the PH correction module 53 may delete each of the previous ten PH entries 56), as described below in further detail. As yet another example, if a lane change has occurred, the PH correction module 53 may append the confidence score and the direction of the lane change to at least one of the PH entries 56.

In some forms, when the lane change determination module 54 has determined that a lane change has occurred, the lane change determination module 54 may be configured to perform various routines to inhibit multiple lane change occurrence detections, thereby preventing the PH correction module 53 from appending excessive amounts of data representing the direction of the lane change and/or the confidence score to the plurality of PH entries 56. As an example, the lane change determination module 54 is configured to limit the amount of iterations in which the lane change determination is made over a period of time. As another example, when the lane change determination module 54 determines that a lane change has occurred, the lane change determination module 54 delays the execution of a subsequent iteration (e.g., between 100 milliseconds and 1 second) in which it attempts to detect another occurrence of a lane change.

The BSM generator module 57 is configured to generate the BSM packet, which may include the at least one PH entry 56 from the database 55. The BSM packet may include an identifier indicating whether the at least one PH entry 56 is associated with a lane change (e.g., the identifier includes at least one of the confidence score and the direction of the lane change as determined by the lane change determination module 54). In some forms, the BSM packet includes a vehicle position (e.g., latitude, longitude, elevation, among others), a vehicle speed, a vehicle heading, a brake status, a turn signal status and other vehicle information based on sensor data obtained by vehicle sensors 60. Once the BSM packet is generated, the communication module 22 is configured to broadcast a V2X signal with the BSM packet embedded therein.

Figure 3:
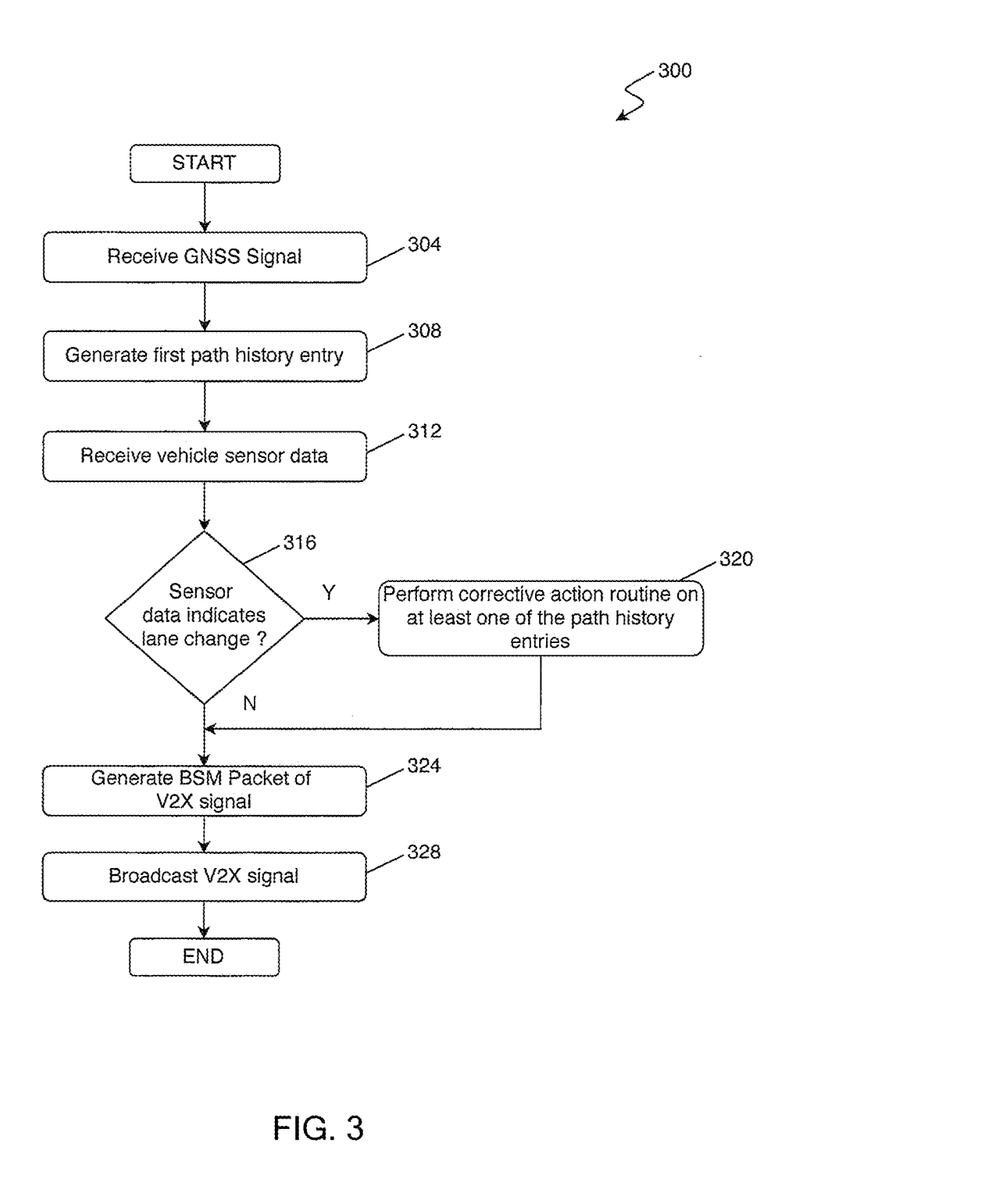
FIG. 3 illustrates an example control routine in accordance with the teachings of the present disclosure.

With reference to FIG. 3, an example control routine 300 is shown. At 304, the GNSS receiver 30 of the V2X system 20 receives the GNSS signal. At 308, the V2X system 20 generates a first PH entry (e.g., PH entry 56-1) based on the location data of the GNSS signal. At 312, the V2X system 20 receives the sensor data from the vehicle sensors 60. At 316, the V2X system 20 determines whether the sensor data obtained from the vehicle sensors 60 indicates a lane change. If so, the control routine 300 proceeds to 320; otherwise, the control routine 300 proceeds to 324.

At 320, the V2X system 20 performs a corrective action routine on the at least one PH entry of the database 55, which includes the first PH entry 56-1. An example corrective action routine includes deleting each of the at least one PH entry 56 of the database 55, which includes the first PH entry 56-1. As another example, the corrective action routine includes adding a data frame to the at least one PH entry with, for example, at least one of the confidence score and the direction of the lane change. The data frame may be generated using any suitable bit values to uniquely identify the direction of the lane change and/or the confidence score.

At 324, the V2X system 20 generates the BSM packet of the V2X signal. At 328, the V2X system 20 broadcasts the V2X signal (e.g., via a radio circuit and one or more antennas of the communication module 22). In one form, the routine is continuously performed as the vehicle 10 is driving and may end when the vehicle is in a park state and/or when power is turned off. It should be readily understood that routine 300 is an example control routine, and other control routines may be implemented.

By executing the control routine 300, the vehicle 10-1 is configured to provide other vehicles 10-2, 10-3, 10-4 the enhanced or updated PH information, and thus, the other vehicles 10-2, 10-3, 10-4 may execute various functions using accurate PH information generated by the vehicle 10-1. For example, by deleting the one or more PH entries 56 from the database 55 when a lane change is identified, the other vehicles 10-2, 10-3, 10-4 are prevented from inaccurately executing functions that utilize the PH entries 56 of the vehicle 10-1, such as identifying occupied lanes, predicting roadway geometry, and executing various local safety systems. As another example, by adding a data frame indicating at least one of the confidence score and the direction of the lane change to the BSM, the other vehicles 10-2, 10-3, 10-4 may selectively perform certain functions that utilize the PH entries 56 of the vehicle 10-1. More specifically, the other vehicles 10-2, 10-3, 10-4 may execute the functions that utilize the PH entries 56 of the vehicle 10-1 when the confidence score is greater than a threshold value and/or when the direction of the lane change meets certain directional criteria.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method for broadcasting a basic safety message (BSM) packet from a host vehicle, the method comprising:
   receiving sensor data from one or more vehicle sensors provided at the host vehicle;
   determining whether the sensor data indicates a lane change of the host vehicle;
   performing a corrective action on at least one path history entry that is stored in a database in response to the sensor data indicating the lane change, wherein the corrective action includes modifying the at least one path history entry to include at least one of a confidence score of the lane change and a direction of the lane change; and
   generating and broadcasting the BSM packet based on the at least one path history entry.

2. The method of claim 1, wherein the sensor data includes information indicative of a vehicle speed, steering wheel position, or a combination thereof.

3. The method of claim 2, wherein determining whether the sensor data indicates the lane change further comprises comparing the sensor data that includes information indicative of the vehicle speed and the steering wheel position to one or more entries of the database, wherein each of the one or more entries is associated with a predefined correlation between the vehicle speed, the steering wheel position, and a lane change determination.

4. The method of claim 1, wherein the sensor data includes one or more images from an image sensor, as the one or more vehicle sensors, and determining whether the sensor data indicates the lane change further comprises performing a lane marking detection analysis on the one or more images.

5. The method of claim 1, wherein performing the corrective action on the at least one path history entry in response to the sensor data indicating the lane change further comprises deleting the at least one path history entry from a database.

6. The method of claim 1, wherein:
   receiving the sensor data from the one or more vehicle sensors further comprises receiving at least one of steering wheel position data from a steering wheel position sensor and image data from an image sensor; and
   modifying the at least one path history entry to include the direction of the lane change further comprises determining the direction of the lane change based on at least one of the steering wheel position data and the image data.

7. The method of claim 1, wherein:
the sensor data includes at least one of vehicle speed data, steering wheel position data, and one or more images; and
modifying the at least one path history entry to include the confidence score of the lane change further comprises:
generating a first confidence value representing a first probability of the lane change of the host vehicle based on the vehicle speed data and the steering wheel position data;
generating a second confidence value representing a second probability of the lane change of the host vehicle based on the one or more images; and
determining the confidence score of the lane change based on the first confidence value and the second confidence value.

8. The method of claim 1, wherein the BSM packet further comprises information indicating at least one of the confidence score of the lane change and the direction of the lane change.

9. The method of claim 1, wherein modifying the at least one path history entry to include the confidence score of the lane change further comprises:
receiving state information from a lane change indicator; and
determining the confidence score of the lane change based on the state information of the lane change indicator.

10. The method of claim 1, wherein generating the BSM packet further comprises in response to performing the corrective action on the at least one path history entry that is stored in the database, adding a data frame to the at least one path history entry, wherein the data frame is indicative of the lane change of the host vehicle.

11. A system for broadcasting a basic safety message (BSM) packet from a host vehicle, the system comprising:
a processor;
a nontransitory computer-readable medium comprising instructions that are executable by the processor, wherein the instructions comprise:
receiving sensor data from one or more vehicle sensors provided at the host vehicle;
determining whether the sensor data indicates a lane change of the host vehicle;
performing a corrective action on at least one path history entry that is stored in a database in response to the sensor data indicating the lane change, wherein the corrective action includes modifying the at least one path history entry to include at least one of a confidence score of the lane change and a direction of the lane change; and
generating and broadcasting the BSM packet based on the at least one path history entry.

12. The system of claim 11, wherein the sensor data includes information indicative of a vehicle speed, steering wheel position, or a combination thereof.

13. The system of claim 12, wherein the instructions to determine whether the sensor data indicates the lane change further comprises comparing the sensor data that includes information indicative of the vehicle speed and the steering wheel position to one or more entries of the database, wherein each of the one or more entries is associated with a predefined correlation between the vehicle speed, the steering wheel position, and a lane change determination.

14. The system of claim 11, wherein the sensor data includes one or more images from an image sensor, as the one or more vehicle sensors, and the instructions to determine whether the sensor data indicates the lane change further comprises performing a lane marking detection analysis on the one or more images.

15. The system of claim 11, wherein the instructions to perform the corrective action on the at least one path history entry in response to the sensor data indicating the lane change further comprises deleting the at least one path history entry from a database.

16. The system of claim 11, wherein:
the sensor data includes at least one of steering wheel position data and image data; and
the instructions to modify the at least one path history entry to include the direction of the lane change further comprises determining the direction of the lane change based on at least one of the steering wheel position data and the image data.

17. The system of claim 11, wherein:
the sensor data includes at least one of vehicle speed data, steering wheel position data, and one or more images; and
the instructions to modify the at least one path history entry to include the confidence score of the lane change further comprises:
generating a first confidence value representing a first probability of the lane change of the host vehicle based on the vehicle speed data and the steering wheel position data;
generating a second confidence value representing a second probability of the lane change of the host vehicle based on the one or more images; and
determining the confidence score of the lane change based on the first confidence value and the second confidence value.

18. The system of claim 11, wherein the BSM packet further comprises information indicating at least one of the confidence score of the lane change and the direction of the lane change.

* * * * *